United States Patent [19]
Joens

[11] Patent Number: 6,115,753
[45] Date of Patent: Sep. 5, 2000

[54] METHOD FOR REROUTING IN HIERARCHICALLY STRUCTURED NETWORKS

[75] Inventor: Yves T' Joens, Sint Andries, Belgium

[73] Assignee: Alcatel, Paris, France

[21] Appl. No.: 09/023,370

[22] Filed: Feb. 13, 1998

[30] Foreign Application Priority Data

Feb. 18, 1997 [EP] European Pat. Off. .............. 97400364

[51] Int. Cl.[7] ............................. G06F 13/38; G06F 15/17
[52] U.S. Cl. ........................ 709/242; 709/241; 709/239; 370/256; 370/390
[58] Field of Search ................................... 370/396, 256, 370/390; 709/242, 239, 241

[56] References Cited

U.S. PATENT DOCUMENTS

| | | | |
|---|---|---|---|
| 5,764,624 | 6/1998 | Endo et al. ............................... | 370/218 |
| 5,831,975 | 11/1998 | Chen et al. .............................. | 370/256 |
| 5,831,982 | 11/1998 | Hummel ................................... | 370/396 |
| 5,903,559 | 5/1999 | Acharya et al. ......................... | 370/355 |
| 5,940,396 | 8/1999 | Rochberger ............................. | 370/408 |
| 5,946,316 | 8/1999 | Chen et al. .............................. | 370/408 |

FOREIGN PATENT DOCUMENTS 0639911   2/1995   European Pat. Off. .

OTHER PUBLICATIONS

IEICE Transactions on Communications, vol. E79–B, No. 8, Aug. 1996. "ATM Routing Algorithms with Multiple QQS Requirements for Multimedia Internetworking", p. 1001.

Electronics & Communications in Japan, Part I—Communications, vol. 78, No. 3, Mar. 1, 1995. Virtual Path Restoration Techniques Based on Centralized Control Functions. p. 15.

ATM–Forum/96–1691 by Iwata et al, "Basic Signalling Procedures for Fault Tolerant PNNI Routing" Dec. 1–6, 1996.

*Primary Examiner*—Zarni Maung
*Assistant Examiner*—Mahmanzar Moezzi
*Attorney, Agent, or Firm*—Ware, Fressola, Van Der Sluys & Adolphson LLP

[57] ABSTRACT

A method for rerouting a connection set up along a path calculated between a first node (A.1.2) and a second node (C.2), of a switching network structured into a plurality of peer groups at at least two hierarchical levels, implies that within a peer group along said path, of not the highest hierarchical level, a local alternative path within this peer group is established between an entering border node and an outgoing border node of said peer group, based on path information stored within this entering border node during set up of the connection, and including an identifier of said outgoing border node of said peer group. In a variant method this path information is stored within each entering border node of each peer group, thereby allowing the local alternative path to be established in the lowest level peer group possible.

28 Claims, 7 Drawing Sheets

| NODE IDENTIFIER | BACKWARD CPL (CONNECT msg) |
|---|---|
| C.2 | [PGI(C.2),I(C.2)]<br>[PGI(C),I(C.2)] |
| C.1 | [PGI(C),I(C.2)] |
| B.2.5 | [PGI(B.2.5),I(B.2.5)]<br>[PGI(B.2),I(B.2.5)]<br>[PGI(C),I(C.2)] |
| B.2.4 | [PGI(B.2.5),I(B.2.5)]<br>[PGI(B.2),I(B.2.5)]<br>[PGI(C),I(C.2)] |
| B.2.3 | [PGI(B.2.5),I(B.2.5)]<br>[PGI(B.2),I(B.2.5)]<br>[PG(C),I(C.2)] |
| B.2.2 | [PGI(B.2),I(B.2.5)]<br>[PGI(C),I(C.2)] |
| B.1.1 | [PGI(B.1.1),I(B.1.1)]<br>[PGI(B.2),I(B.2.5)]<br>[PGI(C),I(C.2)] |
| B.1.3 | [PGI(B.1.1),I(B.1.1)]<br>[PGI(B.2),I(B.2.5)]<br>[PGI(C),I(C.2)] |
| B.1.2 | [PGI(C),I(C.2)] |
| A.3.2 | [PGI(A.3.2),I(A.3.2)]<br>[PGI(A.3),I(A.3.2)]<br>[PGI(C),I(C.2)] |
| A.3.3 | [PGI(A.3.2),I(A.3.2)]<br>[PGI(A.3),I(A.3.2)]<br>[PGI(C),I(C.2)] |
| A.3.4 | [PGI(A.3),I(A.3.2)]<br>[PGI(C),I(C.2)] |
| A.4.6 | [PGI(A.4.6),I(.4.6)]<br>[PGI(A.3),I(A.3.2)]<br>[PGI(C),I(C.2)] |
| A.4.4 | [PGI(A.4.6),I(A.4.6)]<br>[PGI(A.3),I(A.3.2)]<br>[PGI(C),I(C.2)] |
| A.4.5 | [PGI(A.3),I(A.3.2)]<br>[PGI(C)),I(C.2)] |
| A.1.1 | [PGI(A.1.1),I(A.1.1)]<br>[PGI(A.3),I(A.3.2)]<br>[PGI(C),I(C.2)] |
| A.1.2 | |

FIG. 7

METHOD FOR REROUTING IN HIERARCHICALLY STRUCTURED NETWORKS

TECHNICAL FIELD

The present invention relates to a method for rerouting a connection set up between a first terminal coupled to a first node and a second terminal coupled to a second node wherein first node and the second node are part of a switching network structured into a plurality of peer groups at at least two hierarchical levels, the connection being set up along a path calculated between the first node and the second node.

BACKGROUND OF THE INVENTION

Such a method for rerouting is already known in the art, e.g. from the contribution "ATM-Forum/96-1691" by A. Iwata et al, "Basic Signalling procedures for Fault Tolerant PNNI Routing" For the PNNI and SIG Subworking Group of the ATM-forum Technical Committee, Dec. 1–6, 1996. Therein, a signalling procedure of fault tolerant routing is described, basically using the standard Private Network-Network Interface, hereafter abbreviated by PNNI protocol during the set-up procedure for setting up the connection between a source terminal, corresponding to the first terminal, and a destination terminal, corresponding to the second terminal. In case of a failure, either the source node, corresponding to the first node and directly linked to the first terminal, or the destination node, corresponding to the second node and directly linked to the second terminal, have to recalculate a complete new path. Rerouting is thus taking place between the two end nodes of the connection. This method for rerouting is therefore rather time consuming and complex.

SUMMARY OF THE INVENTION

An object of the present invention is to provide a method of the above type but wherein the time for rerouting is much less if compared to the prior art situation.

According to the invention, this object is achieved by a method for rerouting a connection set up between a first terminal coupled to a first node and a second terminal coupled to a second node, the first node and the second node being part of a switching network structured into a plurality of peer groups at at least two hierarchical levels, the connection being set up along a path calculated between the first node and the second node characterised in that within a peer group of the plurality having a hierarchical level lower than the maximum of all the hierarchical levels, along the path, a local alternative path within the peer group is calculated and set up between an entering border node and an outgoing border node of the peer group along the path.

In this way an alternative route within a peer group having not the highest hierarchical level, is calculated and set up. It is evident that calculating and establishing only a small alternative local part of the path requires less computing time and resources than the calculation of a complete new route between both end nodes, the total time needed for rerouting thus being seriously reduced. additional characteristic feature of the present invention is that said local alternative path within said peer group is calculated based on path information stored in the entering node of said peer group, during the set-up of the connection. A corresponding feature of the invention is signalling procedure a signalling procedure for setting up and rerouting a connection between a first terminal coupled to a first node and a second terminal coupled to a second node, the first node and the second node being part of a switching network hierarchically structured into a plurality of peer groups at at least two hierarchical levels, the connection set up along a path calculated between the first node and the second node by the steps of sending a set-up message along the path, in the downstream direction from the first node to the second node, sending, upon receipt of the set-up message by the second node, a connect message from the second node to the first node along the path in the upstream direction, characterised in that, an outgoing border node of a peer group of the plurality, along the path, in the downstream direction determines, upon entering of the connect message within the peer group at the outgoing border node, a unique identifier for the outgoing border node of the peer group for the connection, and adds the unique identifier to the connect message, for further transmitting it to the first node, whereby when the connect message leaves the peer group along the path in the upstream direction at an entering border node, the unique identifier is extracted by and stored in the entering border node, whereby a local alternative path within the peer group is calculated and set up between the entering border node and the outgoing node of the peer group.

In this way, during set-up of the connection along the path, this part of the path within the particular peer group wherein rerouting will take place, is unambiguously secured by this path information, by the inclusion of the identifier of the outgoing border node. This path information is stored in the entering node during the set-up procedure and will enable the entering node to easily determine an alternative path within this peer group, between itself and the outgoing border node. This local alternative route can then afterwards simply be connected to the remainder of the already existing path outside this peer group.

A further characteristic feature of the method is a method as described above wherein if the local alternative path cannot be found within the peer group, a distinct local alternative path is calculated within a restoration peer group including the peer group.

With respect to the signalling procedure as described above, if the local alternative path cannot be found within the peer group, a distinct local alternative path is calculated within a restoration peer group including the peer group.

In this way, if the alternative route can not be found within this peer group, an alternative path is being searched for in a higher level peer group, including this peer group, which will then calculate an alternative path, until a path is found.

Yet another characteristic feature of the method and signalling procedure according to the present invention is that all entering nodes of all peer groups along said path store an identifier of the outgoing node of the peer group they belong to.

In this way, within each distinct peer group along the path, the distinct local part of the path within this distinct peer group is secured by the distinct path information including the identifier of the distinct outgoing node, and stored in the distinct entering node of each distinct peer group along the path. This allows the local alternative path to always be established at the lowest possible level peer group. Since a path within a lower level peer group is smaller than a path within a higher level peer group, the smallest local alternative path is calculated, by this again reducing the computation time since less nodes are involved in this calculation.

Yet another characteristic feature of the method a method as described above wherein in case of failure, the peer group includes the failure.

In case of failure along the path for the connection, the signalling procedure includes the additional steps of sending, upon detecting the failure by a downstream neighbouring node to the failure along the path, a downstream release message from the downstream neighbouring node to the second node, and upon detecting the failure by an upstream neighbouring node to the failure along the path, an upstream release message from the upstream neighbouring node to the first node, whereby the entering node of the peer group is located upstream to the failure location and whereby the peer group includes the failure location whereby upon receipt of the upstream release message by the entering node of the peer group, the entering node blocks the upstream release message from further passing towards the first node, whereby, upon receipt of the downstream release message by the outgoing node of the peer group, the outgoing node blocks the downstream release message from further passing towards the second node.

In this way, in case of a failure occurring along the path, the peer group wherein said alternative path for rerouting the connection is calculated, is including the failure, and both entering and outgoing nodes of this peer group are located such that both can block the generated release messages. During the blocking period the alternative path can then be established and reconnected to the remainder of the original path as will be explained more into detail in a further paragraph.

Another characteristic feature of the signalling procedure is a signalling procedure as described above wherein the upstream release message and the downstream release message respectively include an upstream failure peer group identifier for an upstream failure peer group being one of the each distinct peer groups, wherein the failure was localised by the upstream neighbouring node, and a downstream failure peer group identifier for a downstream failure peer group being one of the each distinct peer groups wherein the failure was localised by the downstream neighbouring node, in that the peer group includes the upstream failure peer group, and the downstream failure peer group.

In this way, the identification of the upstream and downstream failure peer groups within both release messages, will lead to a fast and unambiguous determination of the lowest level peer group including the failure location and wherein the local alternative path exists. This will also be explained more into detail in a further paragraph.

Yet a further characteristic feature of the method is a method as described above wherein the local alternative path is further calculated based on an identifier of the location of the failure within the peer group.

Another feature is a signalling procedure as described above wherein the upstream release message further includes an identifier of the location of the failure within the upstream failure peer group.

In this way, by the availability of additional information concerning the failure location itself, the calculation of the local alternative path can be speeded up, since this information allows to re-use parts of the existing path within the peer group including the failure, so that a complete rerouting within the peer group itself may be replaced by only a partial rerouting within this peer group, thereby accelerating the rerouting procedure.

The present invention further relates to an ingress node, and egress node and a fault determination node, adapted to be used in a network wherein the rerouting method and signalling procedure according to the present invention is applied, as is an ingress node of a switching network hierarchically structured into a plurality of peer groups at at least two hierarchical levels, the ingress node including calculating means adapted to calculate part of a path for a connection within a peer group of which the ingress node forms the entering node in the downstream direction, wherein the calculating means is further adapted to calculate a local alternative path between the ingress node and an outgoing border node of the peer group along the path in the downstream direction; as is an egress node of a switching network hierarchically structured into a plurality of peer groups at at least two hierarchical levels, wherein a path is set up between a first node and a second node of the switching network, the egress node forming an outgoing border node of a peer group along the path in the downstream direction, wherein the egress node includes means adapted to block a downstream release message to further pass along a path; and as is a fault determination node of a switching network being hierarchically structured into a plurality of peer groups at at least two hierarchical levels, the fault determination node including detecting means adapted to detect a failure occurring along a path set up for a connection between a first node and a second node of the switching network, the fault determination node further including release message generating means adapted to generate and transmit a release message along the path, wherein the fault determination node further includes peer group identification means adapted to determine a failure peer group identifier of a peer group including the failure, the release message generating means thereby being further adapted to add the failure peer group identifier to the release message.

Further characteristic features concerning the ingress and egress nodes of the switching network having effects similar to the above discussed features of the method and signalling procedure.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

BEST MODE FOR CARRYING OUT THE INVENTION

The subject method is, in one application, used for connection reconfiguration in case of link or node failures, in networks including at least one hierarchically structured network, wherein a distributed network routing protocol is applicable. An example of such a protocol and network is the standardised Private Network Network Interface, hereafter abbreviated as PNNI, Protocol, as is described in the ATM Forum specification af-pnni-0055.000 of March 1996, applicable on PNNI networks, also described therein. The aim of the subject method is to protect services or connections to accidental failures in the network by means of distributed processing. The remainder of this description will further describe the method in this PNNI domain. It is however evident that the subject method for rerouting can be used in any other network configuration including at least one hierarchically structured network, wherein the method can then be used for rerouting part of a connection within this hierarchically structured network.

In the PNNI domain the different nodes have a knowledge about the complete topology of this network, either directly or indirectly via links with other nodes. Paths between nodes are calculated based on this distributed topology knowledge. To better explain the present invention, first a brief description about the standard PNNI topology and routing principles is given in the next paragraph, which will then be followed by the description of the method and signalling procedure for this PNNI domain.

Figure 1:
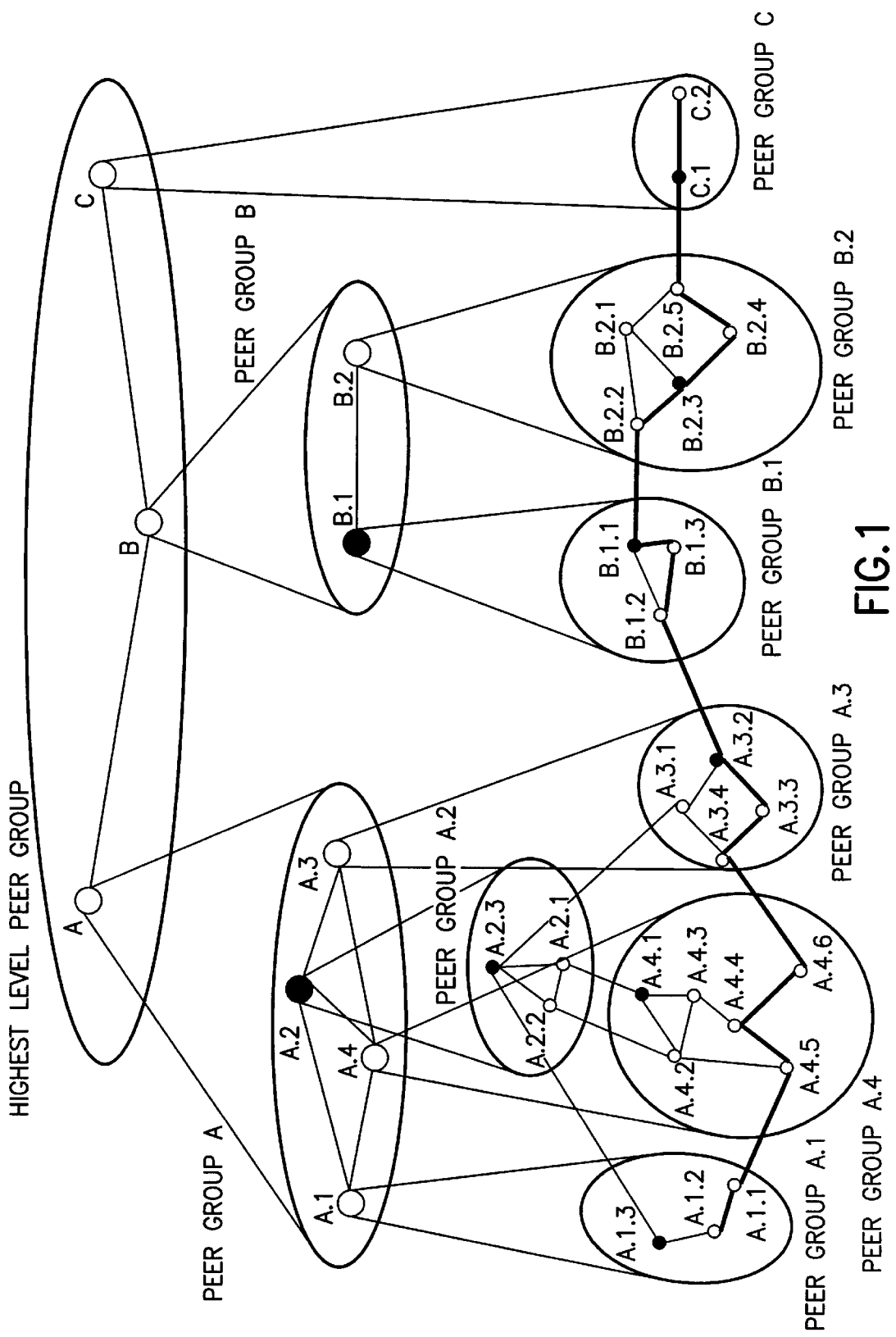
FIG. 1 shows a PNNI network with a path calculated between a source node and a destination node, FIG. 2 schematically shows which connections of FIG. 1 are secured at the lowest level peer groups by one variant of the method in accordance with the invention, FIG. 3 schematically shows which connections of FIG. 1 are secured at higher level peer groups, by this variant of the method according to the invention, FIG. 4 schematically shows which connections of FIG. 1 are secured at the highest level peer group, by this variant of the method according to the invention, FIG. 5 schematically shows how an alternative path is calculated, upon a failure occurring in a lowest level peer group, within the path shown in FIG. 1, by this variant of the method according to the invention, FIG. 6 schematically shows how an alternative path is calculated, upon a failure occurring in a border node of a lowest level peer group, within the path shown in FIG. 1, by this variant of the method according to the invention, FIG. 7 displays a table with the connection protection list, as is generated by one variant of the method, for the path shown in FIG. 1.

The PNNI domain is hierarchically built. In FIG. 1 such a PNNI network is schematically represented. This PNNI network contains 26 nodes at the lowest level which are denoted A.1.1 to A.1.3, A.2.1 to A.2.3, A.3.1 to A.3.4, A.4.1 to A.4.6, B.1.1 to B.1.3, B.2.1 to B.2.5, and C.1 to C.2. The lowest level including all physical nodes is arranged into a number of lowest level peer groups, whereby in each lowest level peer group, topology and reachability information is flooded amongst the members of the peer group. In FIG. 1, the network is divided at the lowest level into 6 lowest level peer groups which are respectively denoted A.1, A.2, A.3, A.4, B.1, B.2, and C. In every lowest level peer group, a peer group leader is elected. In FIG. 1 this is depicted by means of a filled black circle, respectively indicating A.1.3 as peer group leader of peer group A.1, A.2.3 as peer group leader of peer group A.2, A.3.2 as peer group leader of peer group A.3, A.4.1 as peer group leader of peer group A.4, B.1.1 as peer group leader of peer group B.1, B.2.3 as peer group leader of peer group B.2 and C.1 as peer group leader of peer group C. Some of the lowest level peer groups are grouped into a higher level peer group, whereby the peer group leaders of these lowest level peer groups then represent the entire peer groups at this higher level. In FIG. 1 peer groups A.1, A.2, A.3 and A.4 are all grouped into peer group A. At this level, the nodes depicted by A.1, A.2, A.3 and A.4 are logical nodes and no longer physical nodes, whereby each of these logical nodes refers to the respective peer group leader at the lower level, thus node A.1 referring to physical node A.1.3 etc. Similarly peer groups B.1 and B.2 are grouped together into peer group B, at this level logical node B.1 referring to peer group leader B.1.1 and logical node B.2 referring to peer group leader B.2.3. Within these higher level peer groups, the logical nodes will in between themselves elect again a peer group leader, which will once again represent the entire peer group at an even higher level peer group. In FIG. 1, A.2 is peer group leader in peer group A and B.1 is peer group leader in peer group B. At the highest level, logical nodes A, B, and C then respectively refer to peer group leaders A.2, B.1 and C.1. At the highest level no peer group leader is elected. Every peer group leader aggregates topology and reachability information concerning its peer group, and floods this information at the next hierarchical level peer group. Vice versa, the information obtained from other peer groups at the next hierarchical level is injected in the lower level peer group by the peer group leader. By the flooding techniques as described in the PNNI specification every node thus has an idea about the network configuration, not in full detail, but always the aggregated information injected by peer group leaders in the higher level peer groups of a node. In FIG. 1 for example the full configuration that is available to node A1.1 is the information concerning peer group A.1, peer group A and the highest level peer group. This provides every lowest level node the capability to calculate a route to any other part of the network. This capability is used at call set-up time, for calculating a full path between a source or first node and a second or destination node, starting from the source node.

By a first variant of the method according to the present invention, an individual connection in an arbitrary peer group of not the highest hierarchical level along the calculated path is secured. By using this principle, it will be rather easy to locally restore the connection within this peer group, on occasion of a failure within this peer group, or to calculate on forehand some alternative routes which can then be stored and used later in case of failure within this peer group, for reducing the restoration time.

If the alternative route cannot be calculated within this particular peer group, control is passed to the next higher level peer group, which will try to reroute the connection over a wider span.

In the PNNI domain, when a connection is set up, as can be followed on FIG. 1, between a first terminal which is coupled to node A.1.2, being the first node of the connection and a second terminal which is coupled to node C.2, being the second node of the connection, the first terminal issues a set up message to node A.1.2. Node A.1.2 uses the PNNI topology database just described in order to calculate a path towards node C.2. This path is represented in FIG. 1 by the bold lines interconnecting several nodes between A.1.2 and C.2. In the PNNI configuration this path is built by calculating a so-called Designated Transit List, hereafter abbreviated by DTL, which is passed from node to node. By the standardised PNNI set-up procedure, outgoing border nodes of a peer group along a path, hereafter denoted as egress nodes, recognising themselves as the outgoing border nodes from the incoming DTL-stack, will drop part of the DTL stack, whereas incoming border nodes of a peer group along the path, hereafter denoted as ingress nodes, complete the DTL stack by building their view on the local peer group. This DTL stored in each distinct ingress node in fact presents the distinct path information that is standard stored in each distinct incoming border node of each distinct peer group of any level along the calculated path. Intermediate nodes of a peer group only follow directions indicated in the DTL.

This standardised PNNI set up message is not changed by the present invention. In the standard PNNI signalling procedure this set up message is followed by a connect message sent back from the destination node towards the source node. With respect to securing the calculated path in one certain peer group along the path, some extensions are however added to this connect message, for the first variant of the method according to the invention. These extensions on one hand consist of identifying the connection uniquely in this peer group along the path, by identifying the participating egress node, and passing this identifier from this participating egress node to the corresponding ingress node of the same peer group. This is performed by means of information added to the "connect" message of the PNNI signalling protocol. In the PNNI domain this extra information consists of the egress node identifier, the peer group identifier which inherently also indicates the peer group level, and the connection identifier. However, in other networks this information can be bundled together, providing for a unique identifier for the egress node, peer group, peer group level, and connection. This information is added to the connect message by means of a connection protection list, hereafter denoted CPL. By the first variant of the method whereby the path is secured in only one peer group, this information is only generated once by the egress node of this one particular peer group, and extracted from the connect message by the corresponding ingress node of this particular peer group. It is evident that in this case only local connections within this peer group can be re-routed, or in peer groups including this particular peer group, based on the network topology information which is owned by each node of the hierarchical network, as was explained in a former paragraph. In case of failure within this one particular peer group, rerouting within this peer group results in a relatively short local alternative path. In case the failure is however not occurring in this particular peer group, rerouting has to take place in a higher level peer group, including both the particular peer group, and the failure location. On the example of FIG. 1, if a failure occurs in peer group C, and if only peer group A.4 is secured, rerouting has to take place at the highest level, which of course is not optimal. Therefore, in a second variant of the method, each individual connection within each distinct peer group along the path is secured, allowing to optimally reroute a connection in case of failure in any arbitrary peer group along the path.

To this purpose, within each distinct peer group the connect message passes, each distinct egress node generates its part of the CPL list. This list is passed from node to node, whereby the subsequent distinct egress nodes complete the list, and subsequent distinct ingress nodes store part of this information from the list.

For the example of FIG. 1, this can be followed in FIG. 7, representing such a CPL table or stack including the individually built lists by each node, for the shown path of FIG. 1. The upper row of the table should be interpreted as follows: node C.2 will identify itself as the egress node for the peer group C and of the highest level peer group. Node C.2 will therefore create a CPL with the peer group identifier of its highest level peer group, denoted PGI(C) and to be interpreted as the peer group identifier, denoted PGI, of the peer group including logical node C, in FIG. 1 being the highest level peer group. In addition, node C.2 will also add and identifier for its lowest level peer group, hereby denoted as PGI(C.2) and to be also interpreted as the peer group identifier of the peer group including node C.2, to the CPL. In the CPL, both peer group identifiers are further accompanied by an identifier for the node and the connection, in table 1 denoted as I(C.2). This node and connection identifier identifies the connection uniquely in the context of node C.2, and may for instance include the system address of node C.2 to make sure that the ingress peer group node afterwards finds its way to the point of reattachment.

Node C.2 forwards this CPL to C.1, by means of the connect message which is sent along the path in the upstream direction. Node C.1, knowing from the DTL-list of the set-up message that it is an ingress node of peer group C, detects, and pops the line referring to this peer group, denoted [PGI(C.2),I(C.2)], from the stack and keeps it in memory for subsequent possible path restoration. Then it passes the remaining CPL, denoted [PGI(C),I(C.2)], to the node B.2.5. This latter node is the egress node of both peer groups B.2 and B, so it adds or pushes the two identifiers for these peer groups to the CPL, again with the same convention for denotation.

Node B.2.5 passes this CPL further to node B.2.4, via the connect message following the calculated path in the upstream direction. Node B.2.4 is neither egress nor ingress node at either level, therefore B.2.4 passes the CPL to the next node in the upstream direction, unchanged. The same holds for this next node B.2.3.

Node B.2.2 however, knowing it is the ingress node of the lowest level peer group, B.2, pops this line concerning this peer group B.2, and denoted as [PGI(B.2.5),I(B.2.5)], of the stack, and stores this in its own memory. At the second level, thus at peer group B, B.2.2 is not the ingress node, so it will not be involved in path restoration on this level. In fact, it is node B.1.2 which will perform the restoration at the peer group B level.

This process is repeated in every node, with egress nodes pushing CPL information to the stack or table, and ingress nodes popping this information from the stack and storing it, as is summarised in the table of FIG. 7.

The result of this information exchange is that each distinct ingress node of any distinct peer group at any level along the path obtains the unique distinct identifier of the corresponding distinct egress node, as well as the connection identifier that it will need to eventually re-establish the connection at times of failure.

Figure 2:
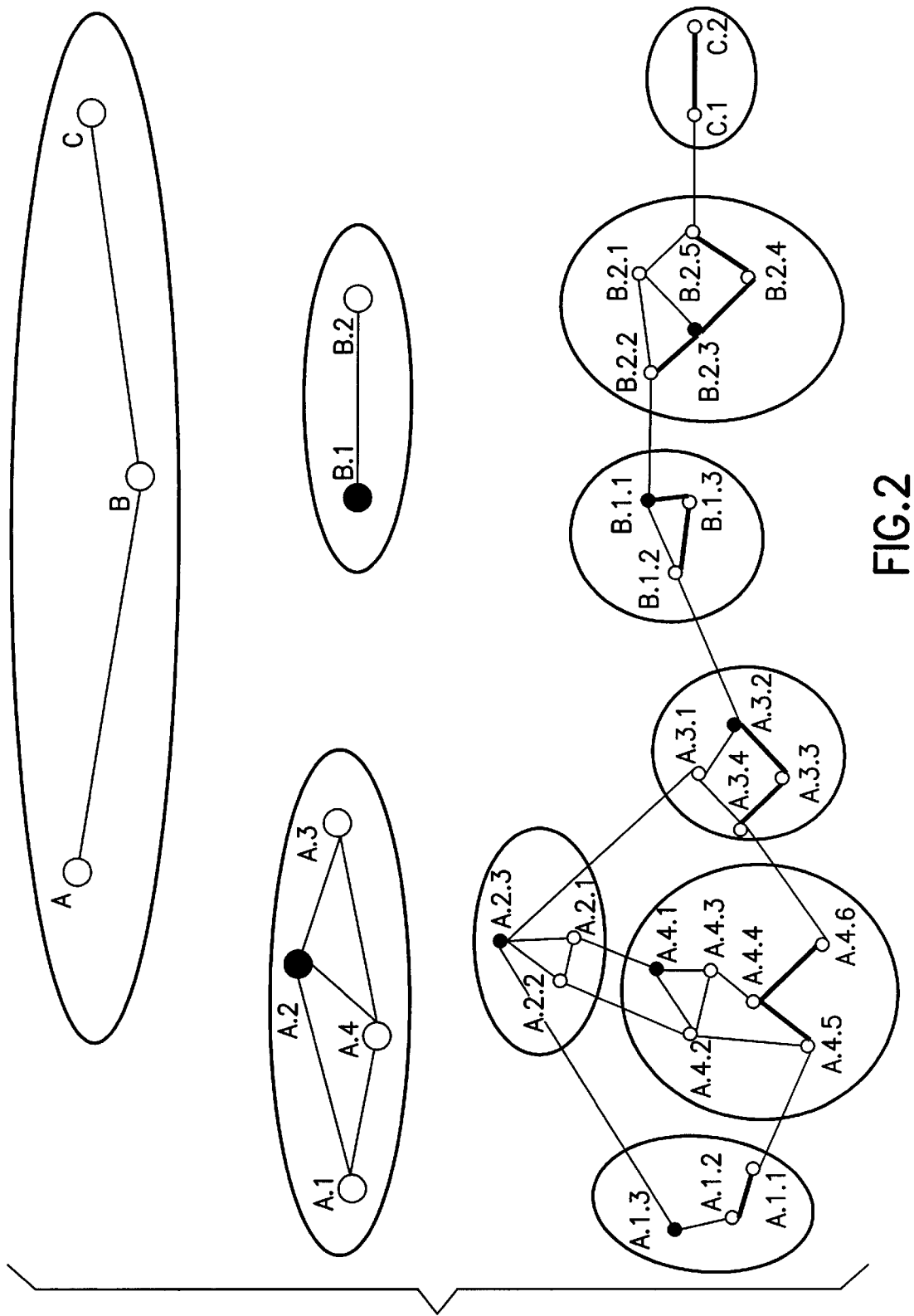
Figure 3:
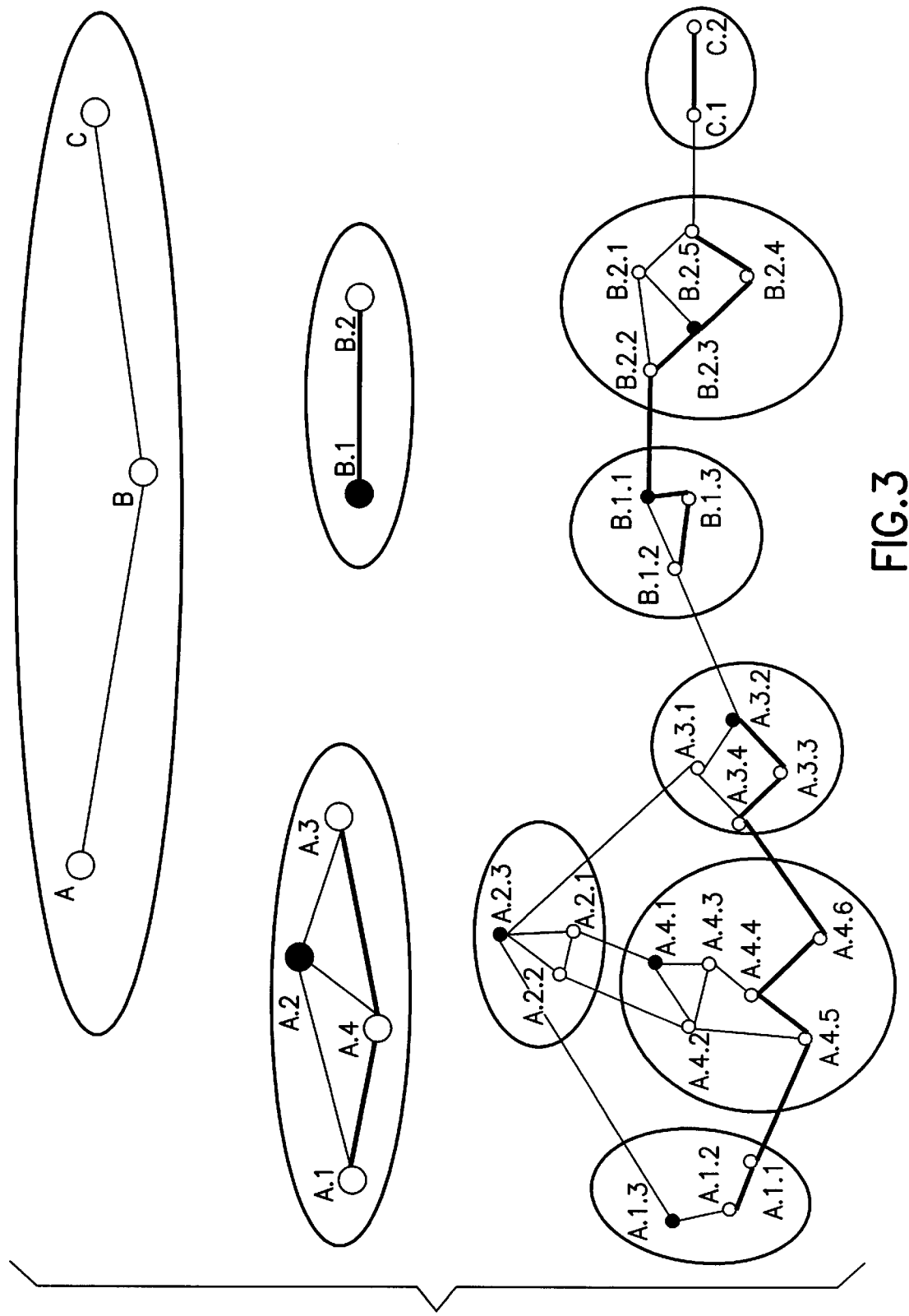
Figure 4:
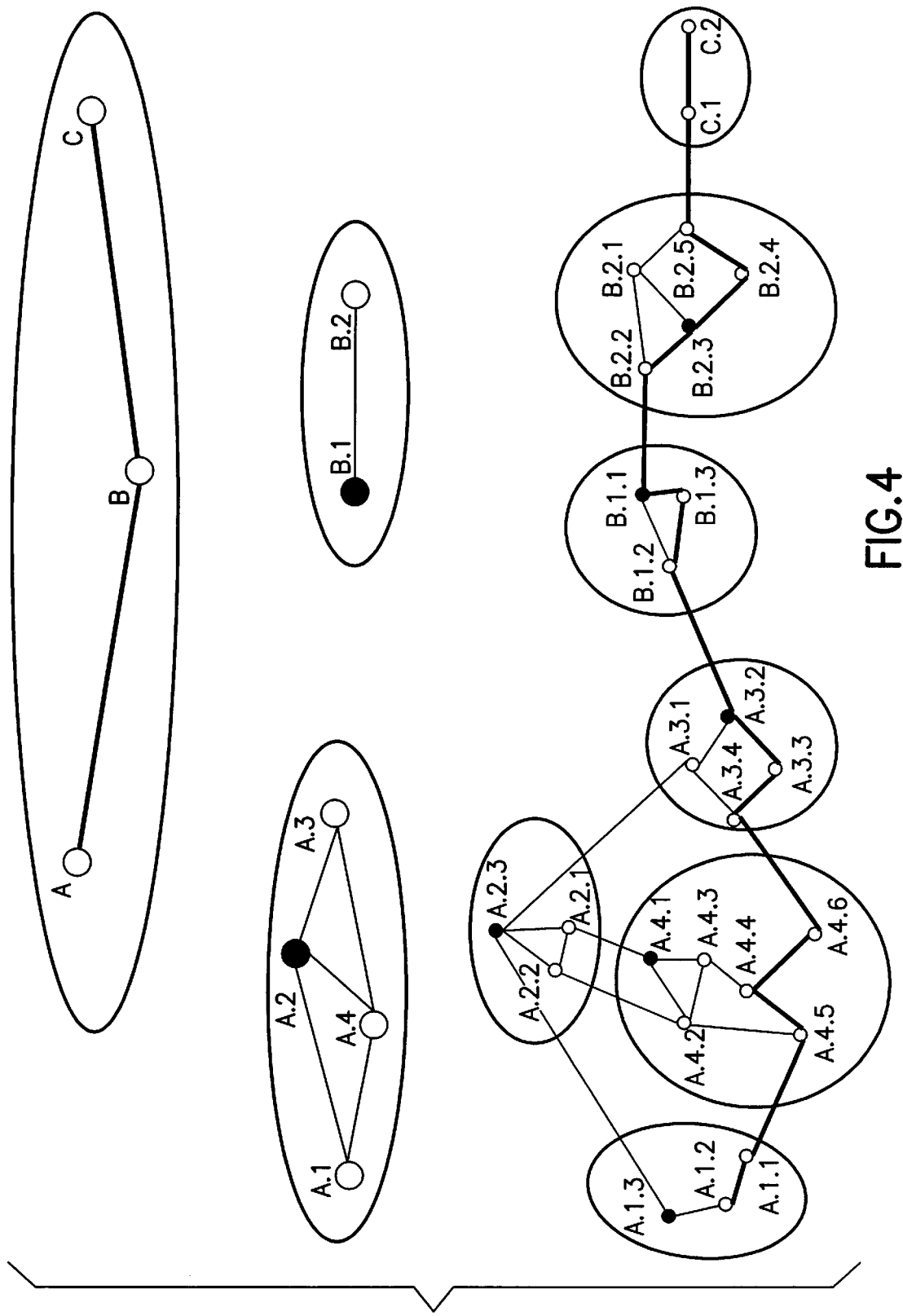

Due to the mechanisms described, the connections at the lowest level are protected as depicted in FIG. 2. This figure should be interpreted as follows: the bold pieces of the path are always protected by the ingress node of the peer group, being the first node in the downstream direction that connects a line. The same picture can be shown for both second level and third level secured paths, as is respectively shown in FIGS. 3 and 4.

The post failure phase starts with the detection of the failure. By the prior art method, if something goes wrong with a node or a link, both upstream and downstream neighbouring nodes to this failure location will detect this, and release the call with an error indication that this connection is network released due to a failure in the path. These release messages inform all nodes they pass along the path that this connection cannot be sustained anymore. The upstream release message is sent from the upstream neighbouring node towards the first node and the downstream release message is sent from the downstream neighbouring node towards the second node.

Figure 5:
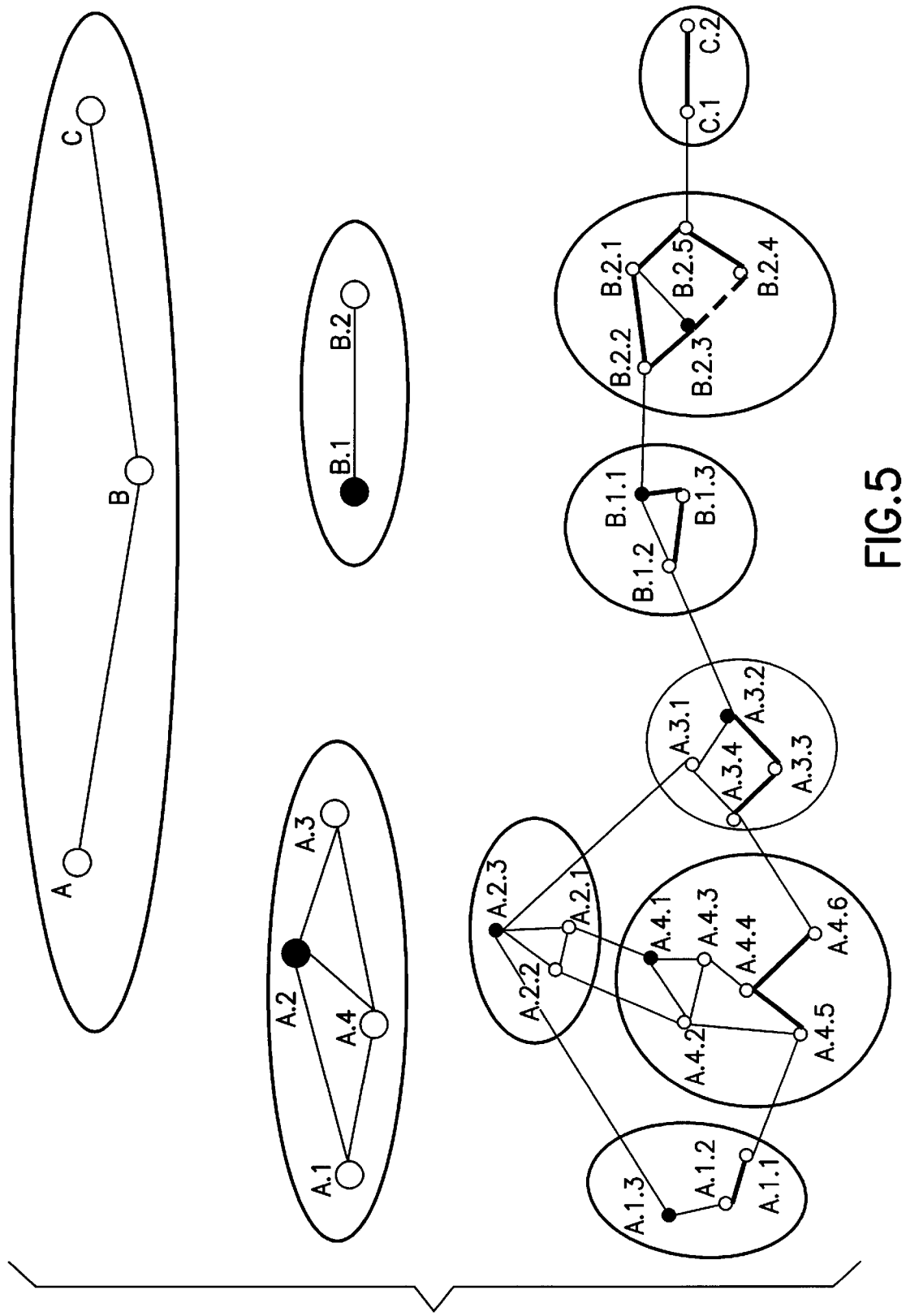

By the second variant of the method of the present invention, where all individual connections within all peer groups along the path are secured, these standard release messages are however extended by the identification of the failure peer group where things went wrong. Therefore a failure peer group identifier is determined separately by the upstream and downstream neighbouring node, possibly resulting in an upstream failure peer group identifier being different from the downstream failure peer group identifier as respectively determined by the upstream and downstream neighbouring nodes. Both neighbouring nodes are able to determine these respective failure peer groups based on their local view they have on the network, and based on the failure location. For example, for an inside failure, being a failure at an inside node or inside link within a lowest level peer group, both upstream and downstream neighbouring nodes will determine this common lowest level peer group as the upstream, resp. downstream failure peer group. In FIG. 5, for instance, the local path between node B.2.3 and node B.2.4 fails, whereby upstream neighbouring node B.2.3 and downstream node B.2.4 both identify this failure. From the identification of the failure and from their respective knowledge of the PNNI topology, node B.2.3, resp B.2.4 determine peer group B.2 to be the upstream, resp downstream failure peer group. The identifier, inherently specifying the level, of the upstream failure peer group is written in an upstream release message generated by node B.2.3, whereas the identifier, inherently specifying the level, of the downstream failure peer group is written in a downstream release message generated by node B.2.4. Both neighbouring nodes will then release the connection, by sending the upstream, resp. downstream release message along the previously calculated path in the upstream, resp downstream direction.

In case of an outside link failure, being a failure at a link between two peer groups, both upstream and downstream neighbouring nodes belong to a different lowest level peer group, but will determine, based on their local view of the network, and on the failure location, the upstream and downstream failure peer group to be this peer group at the lowest possible level, they both form part of. Still in this case both upstream and downstream failure peer groups are initially determined to be the same. In case however of failure of a border node of a peer group, this will be different. In the example shown in FIG. 6 where node A.4.6 becomes inoperational, nodes A.4.4 and A.3.4, being respectively the upstream neighbouring node, and the downstream neighbouring node from the failure location, will detect the failure but will determine a different upstream and downstream failure peer group. Indeed, node A.4.4, detecting that its link between itself and node A.4.6 is not functional anymore, may interpret this failure as an inside link failure within its lowest level peer group A.4, and therefore decide this to be the upstream failure peer group. On the other hand, downstream neighbouring node A.3.4 detects a failure on its link to node A.4.6, being an outside link to its peer group, and therefore decides the parent peer group, being peer group A, to be the failure peer group.

In general, the upstream release message is passed from node to node in the upstream direction, whereby each node checks whether it is the ingress node of the identified upstream failure peer group. Ingress nodes are adapted to perform this checking, by for instance comparing part of their path information stored during set up, indicating of which peer group they form the ingress node, with the upstream failure peer group identifier that they have extracted from the upstream release message. If the node is not the ingress node of the identified upstream failure peer group, it passes the upstream release message further in the upstream direction towards the next node, until the ingress node of the upstream failure peer group is reached. In the downstream direction a similar procedure takes place, but each node in this direction along the path now checking whether it is the egress node of the identified downstream failure peer group. Egress nodes are adapted to perform this checking by, for instance comparing the identifier of the downstream failure peer group, they extracted from the downstream release message, with part of their own identifier, indicating their own peer group. The egress node of the downstream failure peer group will hold the release message, and start a reattachment supervision timer, the duration of which may be software controlled by for instance an operator. The reason for this is to block the downstream release message for passing to the second or destination node and the second user terminal, informing the latter that the complete connection has to be restored.

In the upstream direction, the ingress node of the upstream failure peer group will start recalculating the route within the identified upstream failure peer group based on the standardised PNNI information and from the extra information stored during the extended connect phase. Therefrom this ingress node knows the corresponding egress node of the upstream failure peer group, to which it has to recalculate a local alternative path. If the calculation was successful, a new local set-up message is sent, from this ingress node of the upstream failure peer group, to the corresponding egress node of this upstream failure peer group, carrying the connection identifier. The egress node of the upstream failure peer group will receive the new local set-up with the connection identifier, and will switch the connection internally, even if the downstream release message should not yet have arrived in the particular egress node of the upstream failure peer group, which is for instance the case if the downstream release message should have been blocked by another node. In the case the downstream release message is received in the egress node of the upstream failure peer group, before this node receives the new local set-up message, the initiated reattachment timer will be stopped upon this receipt of the new local set-up and switchover takes place. This occurs mostly when both upstream and downstream failure peer groups are identical, and when the ingress node of the upstream failure peer group has succeeded to find a local alternative path within this peer group.

In case no release message should have been received by the egress node of the upstream failure peer group prior to the receipt of the new local setup message, switchover takes place anyhow, whereby this egress node of the upstream failure peer group further generates a new release message, this time for sending it in the upstream direction, until the node which has blocked the original downstream release message is met. This new upstream release message thereby clears the not used part of the old connection.

In another case where the reattachment timer in the egress node of the downstream failure peer group has expired, before a new local set-up is arrived in this node, this node generates a new downstream release message, with a new downstream peer group identifier, of the peer group of the next higher level including the former identified downstream peer group.

Remark that the reattachment timer only has a supervision function, and by no means influences the service restoration time.

In case the ingress node of the upstream failure peer group cannot find an alternative path within the identified upstream failure peer group, control is passed to the next higher level peer group, of which the upstream failure peer group forms part. Therefore also the upstream release message is altered by the ingress node of the original upstream failure peer group, identifying a new upstream failure peer group as the peer group at one level higher than the original upstream failure peer group, and including this upstream failure peer group. The procedures of sending the updated upstream release message, finding the corresponding ingress and egress nodes and recalculation and either re-establishment of the connection or either looking for an even higher level upstream failure peer group are then repeated until an alternative path is found.

In the example of FIG. 5, the first upstream node that the upstream release message finds along the path is node B.2.2. This node recognises it is the ingress node of the upstream failure peer group B.2 for the released connection. From the information it has stored during the extended connect procedure, namely that for this connection, its corresponding egress node for this upstream peer group B.2, is node B.2.5, node B.2.2 calculates an alternative path from itself to its corresponding egress node B.2.5, based on standardised PNNI routing algorithms. Node B.2.2 will, if the calculation was successful, meaning an alternative path is indeed available, issue a local set-up message with the connection identifier to node B.2.5. Node B.2.5, by receiving the downstream release message, extracting therefrom the downstream failure peer group identifier, and identifying from this and form its own peer group identifier that it is the egress node of this downstream failure peer group, had already started its reattachment timer. If now the local set-up message would arrive before the reattachment timer has expired, the new local set-up message takes precedence, and node B.2.5 switches to the new connection, using local switchover procedures which are commonly known by a person skilled in the art, and which will therefore not be described in this document. The reattachment timer is also stopped upon receiving of this local set-up message.

Figure 6:
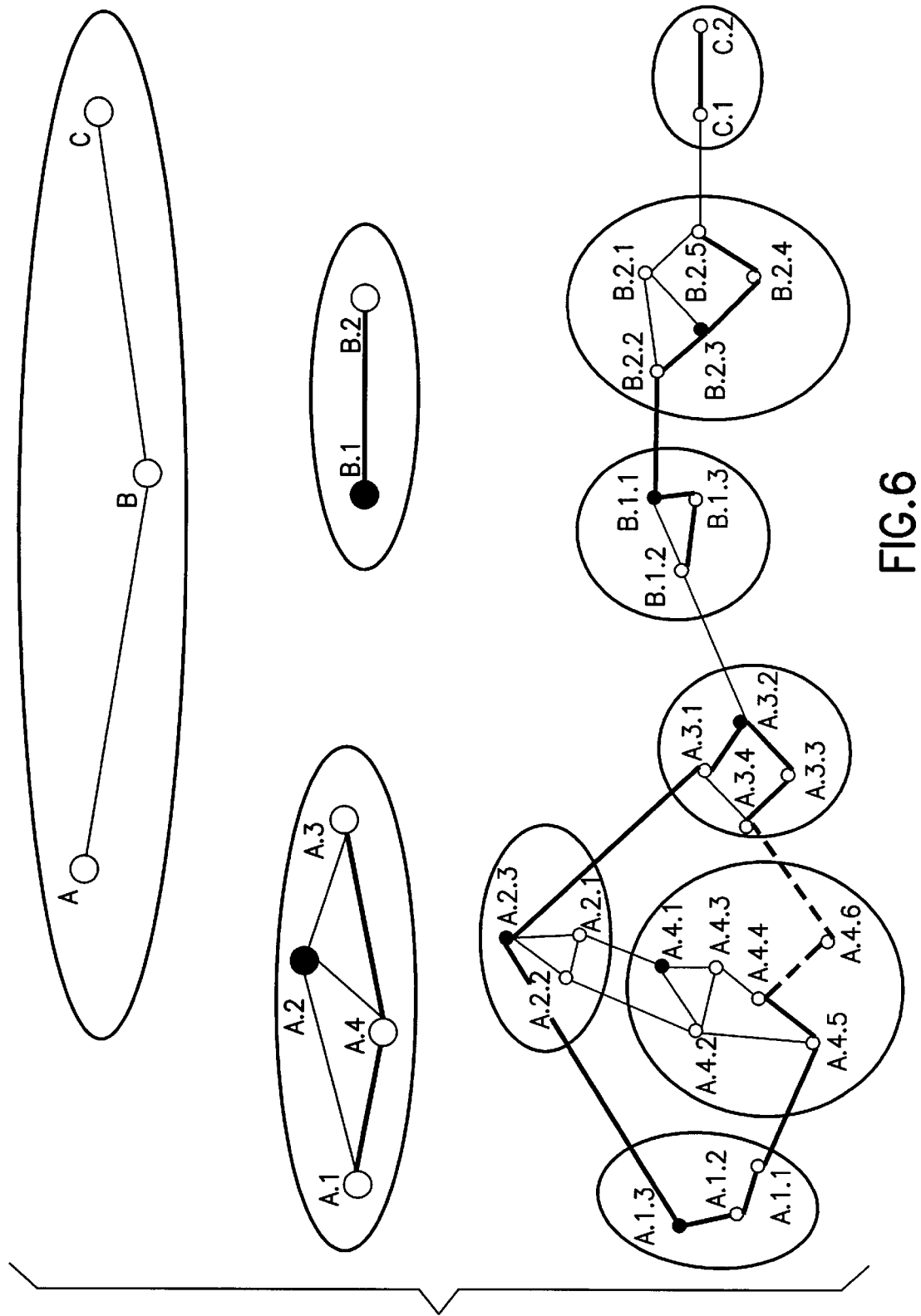

In the example of FIG. 6, the upstream release message is passed back from node A.4.4 in the upstream direction towards node A.4.5. This node has to check whether it is an ingress node of upstream failure peer group A.4, otherwise pass the upstream release message back to the next node in the upstream direction. Since A.4.5 is the ingress node of peer group A.4, it will try to calculate an alternative path to egress node of A.4, being A.4.6.

In this example such an alternative path is however not available, which will also be the conclusion of node A.4.5. It therefore updates the original release message with an updated upstream failure peer group identifier, being the identifier of peer group A, and sends this updated upstream release message again upstream via the original path. Each node checks again whether it is the ingress node of peer group A, along the path, thereby passing this upstream release message further along this path, until finally the ingress node of the connection for peer group A is found, being node A.1.2. This node will find, from its stored information that the corresponding egress node, for peer group A, is node A.3.2, and it will calculate an alternative path to this node. In the downstream direction node A.3.4 has already passed the downstream release message further towards nodes A.3.3 and A.3.2, the latter finding it is the egress node of the indicated downstream failure peer group A.3. This node starts a reattachment time until the new local set-up message sent from node A.1.2 to node A.3.2 via nodes A.1.3,A.2.3,A.3.1 will indicate that an alternative path was found. Node A.3.2 stops the timer and further re-establishes the complete connection.

It needs to be further remarked that the route calculation for back up routes can be done off-line although this cannot take into account all failed links. Therefore a number of alternative routes may be kept in memory on forehand for those connections that need service restoration in a fast way.

Note that in this description the method was explained with respect to the ingress node restoring the failure. It is also perfectly possible that the egress node can perform this action, this latter alternative method however requiring an extra adaptation of the set-up procedure, namely that each egress node now has to store, from the set-up message, the necessary topology information concerning its peer group, for later being having the necessary information for restoring a local path in this peer group. This is different from the standardised PNNI set-up procedure, where each ingress node normally stores this information. Furthermore, during set-up in the alternative method, each ingress node has to add a unique identifier for itself within its peer group, and the connection. The egress node also has to extract this information from the set-up message. All this information will then allow the egress node to recalculate an alternative path in case of failure. In this case, the egress node becomes the master whereas the ingress node becomes the slave.

To easy the task of recalculating an alternative route by either ingress or egress node, the release message may as well include an identification of the failure location. This information can inform the node charged with the recalculation which part of the previously calculated route is still intact. This information can then be further used during the recalculation, thereby possible shortening the time needed to find a valid alternative route.

While the principles of the invention have been described above in connection with specific apparatus, it is to be clearly understood that this description is made only by way of example and not as a limitation on the scope of the invention.

What is claimed is:

1. A method for rerouting a connection earlier set up and established between a first terminal coupled to a first node (A.1.2) and a second terminal coupled to a second node (C.2), said first node and said second node being part of a switching network structured into a plurality of peer groups at at least two hierarchical levels, said earlier setup connection being set up along a path calculated between said first node (A.1.2) and said second node (C.2) comprising the steps of:

determining if a failure has occurred in the earlier setup connection; and if such a failure is determined then within a peer group of said plurality of peer groups having a hierarchical level lower than the maximum of all said hierarchical levels, along said path, calculating and setting up a local alternative path within said peer group between an entering border node and an outgoing border node of said peer group along said path.

2. A method according to claim 1 characterised in that said local alternative path is calculated based on path information identifying said path within said peer group, including an identifier of said outgoing border node of said peer group for said connection, and stored in said entering border node of said peer group during set-up of said connection along said path.

3. A method according to claim 1 characterised in that in case said local alternative path cannot be found within said peer group, a distinct local alternative path is calculated within a restoration peer group including said peer group.

4. A method according to claim 1 characterised in that each distinct entering border node of each distinct peer group along said path stores distinct path information identifying said path within said each distinct peer group respectively and including an identifier of a respective distinct outgoing border node of said each distinct peer group along said path for said connection respectively, and so that said peer group is one of said each distinct peer groups and having the lowest hierarchical level at which said local alternative path exists.

5. A method according to claim 1 characterised in that in case of failure, said peer group includes said failure.

6. A method according to claim 5 characterised in that said local alternative path is further calculated based on an identifier of the location of said failure within said peer group.

7. A signalling procedure for setting up and rerouting a connection earlier set up and established between a first terminal coupled to a first node (A.1.2) and a second terminal coupled to a second node (C.2), said first node and said second node being part of a switching network hierarchically structured into a plurality of peer groups at at least two hierarchical levels, said earlier connection set up along a path calculated between said first node (A.1.2) and said second node (C.2) by the steps of sending a set-up message along said path, in the downstream direction from said first node (A.1.2) to said second node (C.2), sending, upon receipt of said set-up message by said second node (C.2), a connect message from said second node (C.2) to said first node (A.1.2) along said path in the upstream direction, said signalling method comprising the steps of:

an outgoing border node of a peer group of said plurality, along said path, in the downstream direction determines, upon entering of said connect message within said peer group at said outgoing border node, a unique identifier for said outgoing border node of said peer group for said connection, and adds said unique identifier to said connect message, for further transmitting it to said first node, when said connect message leaves said peer group along said path in the upstream direction at an entering border node, extracting said unique identifier stored in said entering border node, and calculating a local alternative path within said peer group and setting up said local alternative path between said entering border node and said outgoing node of said peer group.

8. A signalling procedure according to claim 7 characterised in that in case said local alternative path cannot be found within said peer group, a distinct local alternative path is calculated within a restoration peer group including said peer group.

9. A signalling procedure according to claim 7 characterised in that each distinct outgoing border node of each distinct peer group included in said plurality and along said path in the downstream direction, respectively determines, upon entering of said connect message within said each distinct peer group at said each distinct outgoing border node respectively, a distinct unique identifier for said each distinct outgoing border node for said each distinct peer group and for said connection, and adds said distinct unique identifier to said connect message, so that when said connect message leaves said each distinct peer group at a distinct entering border node respectively, said distinct unique identifier is extracted by and stored in said distinct entering border node respectively, and so that said peer group is one of said each distinct peer groups, having the lowest hierarchical level at which said alternative path exists.

10. A signalling procedure according to claim 7 characterised in that in case of failure along said path for said connection, said signalling procedure includes additional steps of sending, upon detecting of said failure by a downstream neighbouring node to said failure along said path, a downstream release message from said downstream neighbouring node to said second node(C.2), and upon detecting of said failure by an upstream neighbouring node to said failure along said path, an upstream release message from said upstream neighbouring node to said first node, so that said entering node of said peer group is located upstream to said failure location and so that said peer group includes said failure location, so that upon receipt of said upstream release message by said entering node of said peer group, said entering node blocks said upstream release message from further passing towards said first node, and so that upon receipt of said downstream release message by said outgoing node of said peer group, said outgoing node blocks said downstream release message from further passing towards said second node.

11. A signalling procedure according to claim 10 characterised in that said upstream release message and said downstream release message respectively include an upstream failure peer group identifier for an upstream failure peer group being one of said each distinct peer groups, wherein said failure was localised by said upstream neighbouring node, and a downstream failure peer group identifier for a downstream failure peer group being one of said each distinct peer groups wherein said failure was localised by said downstream neighbouring node, in that said peer group includes said upstream failure peer group, and said downstream failure peer group.

12. A signalling procedure according to claim 11 characterised in that said upstream release message further includes an identifier of the location of said failure within said upstream failure peer group.

13. An ingress node of a switching network hierarchically structured into a plurality of peer groups at at least two hierarchical levels, said network having a connection earlier set up and established between a first node and a second node, said earlier connection being set up along a path calculated between said first node and said second node, said ingress node including calculating means adapted to calculate part of a path for a connection within a peer group of which said ingress node forms the entering node in the downstream direction, characterised in that said calculating means is further adapted to calculate a local alternative path between said ingress node and an outgoing border node of said peer group along said path in the downstream direction if a failure is determined in the connection earlier set up.

14. An ingress node according to claim 13 characterised in that said ingress node further includes extracting means adapted to extract an identifier of said outgoing border node of said peer group, from an upstream connect message and memory means adapted to store said identifier of said outgoing border node of said peer group.

15. An ingress node according to claim 13 characterised in that said ingress node further includes release message blocking means for blocking a release message to further pass along said path.

16. An ingress node according to claim 13 characterised in that said ingress node includes switchover means adapted to interconnect a part of said path upstream to said ingress node, and said local alternative path.

17. An ingress node according to claim 13 characterised in that said extraction means is further adapted to extract a failure peer group identifier from said release message.

18. An ingress node according to claim 13 characterised in that said ingress node further includes message generating means adapted to generate a local set-up message including information concerning said local alternative path, said ingress node further includes transmission means adapted to transmit said local set-up message towards said outgoing border node of said peer group.

19. An ingress node according to claim 13 characterised in that said ingress node further includes means adapted to generate an upstream release message including a peer group identifier of the next higher level peer group including said peer group.

20. An egress node of a switching network hierarchically structured into a plurality of peer groups at at least two hierarchical levels, said network having a connection earlier set up and established between a first node and a second node, said earlier connection being set up along a path calculated between said first node and said second node, wherein a path is set up between a first node and a second node of said switching network, said egress node forming an outgoing border node of a peer group along said path in the downstream direction, characterised in that
said egress node includes means adapted to block a downstream release message to further pass along a path if a failure is determined in the connection earlier set up.

21. An egress node according to claim 20 characterised in that said egress node includes means adapted to determine a unique identifier for said egress node within said peer group for said connection, and includes means adapted to add said unique identifier to a connect message in the upstream direction.

22. An egress node according to claim 20 characterised in that said egress node includes release message extracting means adapted to extract an identifier of a downstream failure peer group from said downstream release message.

23. An egress node according to claim 22 characterised in that said egress node includes comparing means adapted to compare said identifier of said downstream failure peer group with part of said unique identifier identifying said peer group.

24. An egress node according to claim 20 characterised in that said egress node includes receiving means adapted to receive a local set-up message, and extracting means adapted to extract therefrom information concerning a local alternative path within said peer group.

25. An egress node according to claim 24 characterised in that said egress node includes switchover means adapted to interconnect a part of said path downstream to said egress node and said local alternative path.

26. An egress node according to claim 20 characterised in that said egress node further includes a timer, adapted to be triggered and initialised upon receipt of said downstream release message.

27. An egress node according to claim 20 characterised in that said egress node further includes downstream release message generating means adapted to generating a downstream release message including a peer group identifier of a peer group including said peer group at the next higher hierarchical level.

28. A fault determination node of a switching network being hierarchically structured into a plurality of peer groups at at least two hierarchical levels, said network having a connection earlier set up and established between a first node and a second node, said earlier connection being set up along a path calculated between said first node and said second node, said fault determination node including detecting means adapted to detect a failure occurring along a path set up for a connection between a first node and a second node of said switching network, said fault determination node further including release message generating means adapted to generate and transmit a release message along said path, characterised in that
said fault determination node further includes peer group identification means adapted to determine a failure peer group identifier of a peer group including said failure, said release message generating means thereby being further adapted to add said failure peer group identifier to said release message.

* * * * *